United States Patent [19]

Lucas et al.

[11] 4,019,066
[45] Apr. 19, 1977

[54] MEASURING THE SURFACE ROUGHNESS OF A MOVING SHEET MATERIAL

[75] Inventors: John M. Lucas, Montreal; Serge Gracovetsky, St. Lambert, both of Canada

[73] Assignee: Domtar Limited, Montreal, Canada

[22] Filed: Mar. 25, 1975

[21] Appl. No.: 561,900

[30] Foreign Application Priority Data

Apr. 16, 1974 Canada .............................. 197731

[52] U.S. Cl. .............................. 250/562; 250/572; 356/120; 356/199; 356/209

[51] Int. Cl.² ................. G01N 21/32; G01B 11/30; G01N 21/48

[58] Field of Search .......... 250/559, 562, 563, 572; 356/199, 200, 210, 120, 209

[56] References Cited

UNITED STATES PATENTS

| | | | |
|---|---|---|---|
| 2,947,212 | 8/1960 | Woods | 250/572 |
| 3,176,306 | 3/1965 | Burns | 250/572 |
| 3,436,556 | 4/1969 | McCartney | 356/200 |
| 3,469,104 | 9/1969 | Hector | 356/200 X |
| 3,496,365 | 2/1970 | Mounce | 250/563 |
| 3,591,291 | 7/1971 | Greer et al. | 356/199 X |

Primary Examiner—Craig E. Church
Assistant Examiner—David K. Moore
Attorney, Agent, or Firm—C. A. Rowley

[57] ABSTRACT

The invention is concerned with measuring "on-line" the surface roughness of a moving sheet material, e.g. a paper web. The method comprises illuminating the moving web, preferably at a low angle, suitably collecting the light reflected from the moving web and processing the light by means of a sensitive photo-electrical system. The electrical signals thus obtained are divided into an AC and a DC component, the components are separately measured and their ratio used as an index of roughness. An apparatus for carrying out roughness measurements on a moving paper web, e.g. on a paper machine, is described.

12 Claims, 7 Drawing Figures

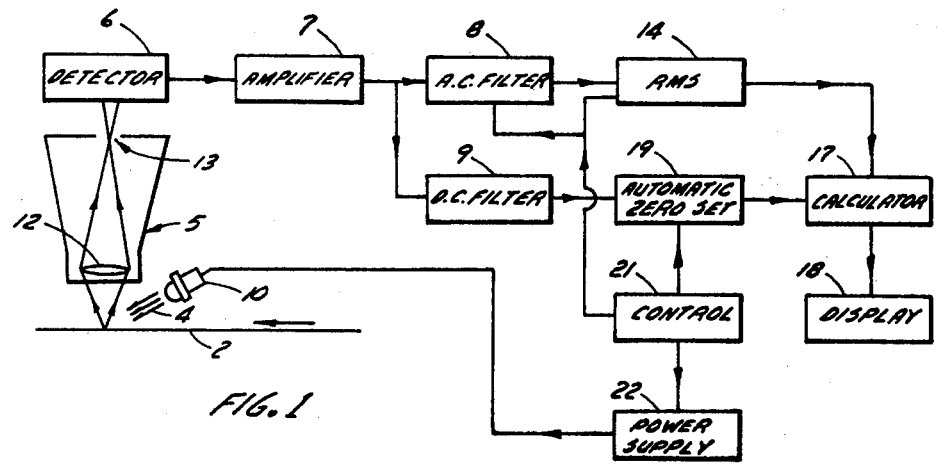
FIG. 1
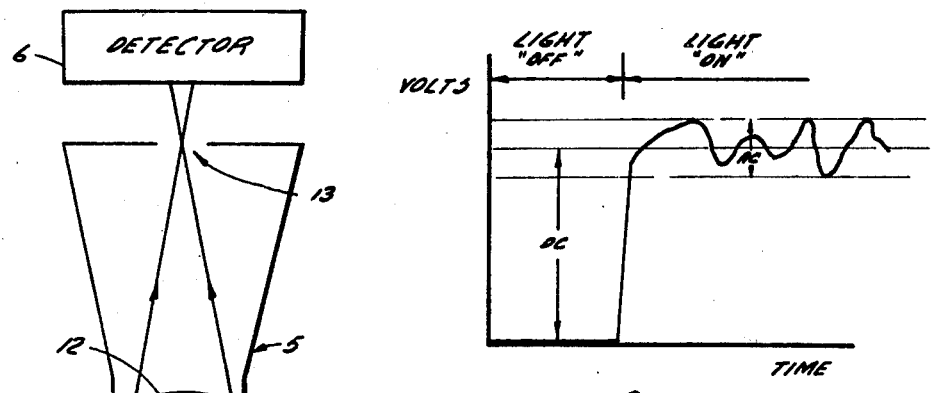
FIG. 2
FIG. 3
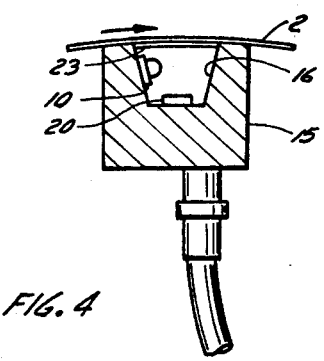
FIG. 4

4,019,066

MEASURING THE SURFACE ROUGHNESS OF A MOVING SHEET MATERIAL

FIELD OF THE INVENTION

The present invention relates to the measuring of the roughness of the surface of a material. It relates more particularly to a method and apparatus for the measuring of surface roughness of sheet materials such as paper, board and the like.

By roughness (or its opposite, smoothness) is generally understood the geometrical property of the surface which may be defined as its deviation from (or in the opposite case, closeness to) an ideally flat plane. In the case of paper or board, the deviations that are perceived as roughness are on a very small scale, and occur as "topographic" features on the surface (peaks or valleys) having dimensions of the order of 0.1–2.0 mm in the plane of the paper, and about 0.01–0.5 mm in the direction normal to the plane. Deviations of lower frequency and larger dimensions would generally contribute to properties other than roughness and may come, e.g. under the designation of "waviness", or indicate variations in thickness, etc.

DESCRIPTION OF THE PRIOR ART

The importance of controlling the roughness of paper surface will be evident, e.g. for printability. Roughness measurement is also of importance, however, in the process of making the paper, e.g. for proper control of roll build, for detection of graininess, and so on. It is therefore of great advantage to the papermaker to have a reliable method or instrument for comparing or measuring the roughness of various papers and particularly a method or instrument that would permit "on-machine" measuring, i.e. the taking of measurements on a moving web.

There are various methods and instruments for the testing of paper roughness. The best known are air-leak instruments such as the Sheffield, the Bendsten and the like. In these methods a cup-like device containing pressurized gas is applied tightly against the surface of the sheet. The escape of the gas from inside the cup through the gaps along the line of contact with the surface will be a function of the roughness of the surface and will provide a measure of it.

There are also optical methods of measuring surface properties of sheet material. These are mostly directed to the detection of individual surface blemishes, or to the measurement of gloss, but some are also directed to the measurement of roughness. A surface roughness meter is disclosed in Canadian Pat. No. 698,194 wherein a two-colour photo-meter utilizes the difference in the reflectance of two different wave-lengths to devise a measure of the surface roughness. A known method of evaluating surface roughness is to view a sample of the surface through a microscope under suitable magnification and under a low-angle illumination such that the light will throw the surface into relief and accentuate the shadows cast by the peaks and valleys on the surface; this method relies entirely on subjective judgement in the making of comparisons. The existing methods are generally not adapted to on-line measurement of moving webs, particularly webs travelling at present-day high speeds on the paper machine.

BRIEF DESCRIPTION OF THE INVENTION

The present invention provides a device and a method for measuring the surface roughness of a moving sheet or web of paper.

The device of the present invention consists essentially of means for projecting a beam of light at a fixed, preferably low, angle to illuminate obliquely the surface of a moving web, collector means for collecting scattered reflected light from small areas of the illuminated surface of the moving web sequentially appearing in front of said collector means, photoelectric means for converting the light reflected from the said small area of the illuminated surface into electrical signals, and analyzer means for converting said electrical signals into an index of surface roughness.

The invention also provides a method for measuring the surface roughness of a moving sheet of paper which method comprises projecting a beam of light onto the said surface at a fixed, preferably low, angle to the surface, collecting reflected scattered light from a continuous sequence of small areas of the illuminated surface, converting the collected light to electrical signals, analyzing said electrical signals into a direct component and an alternating component, measuring said direct and said alternating components and deriving an index of roughness from the ratio of magnitudes of said alternating component and said direct component.

The device of the present invention will be described in conjunction with the drawing in which:

THE DRAWINGS

FIG. 1 is a diagrammatic representation of the apparatus of this invention;

FIG. 2 is a diagrammatic illustration of the operation of the device, including the oblique illumination of a rough paper sheet and the collection of reflected scattered light from a small area of the said surface;

FIG. 3 is a diagrammatic representation of the electrical signals generated by the light reflected from the surface;

FIG. 4 is a diagram showing the apparatus, applied to the surface of a travelling web of paper;

DESCRIPTION OF THE PREFERRED EMBODIMENT

Figure 5:
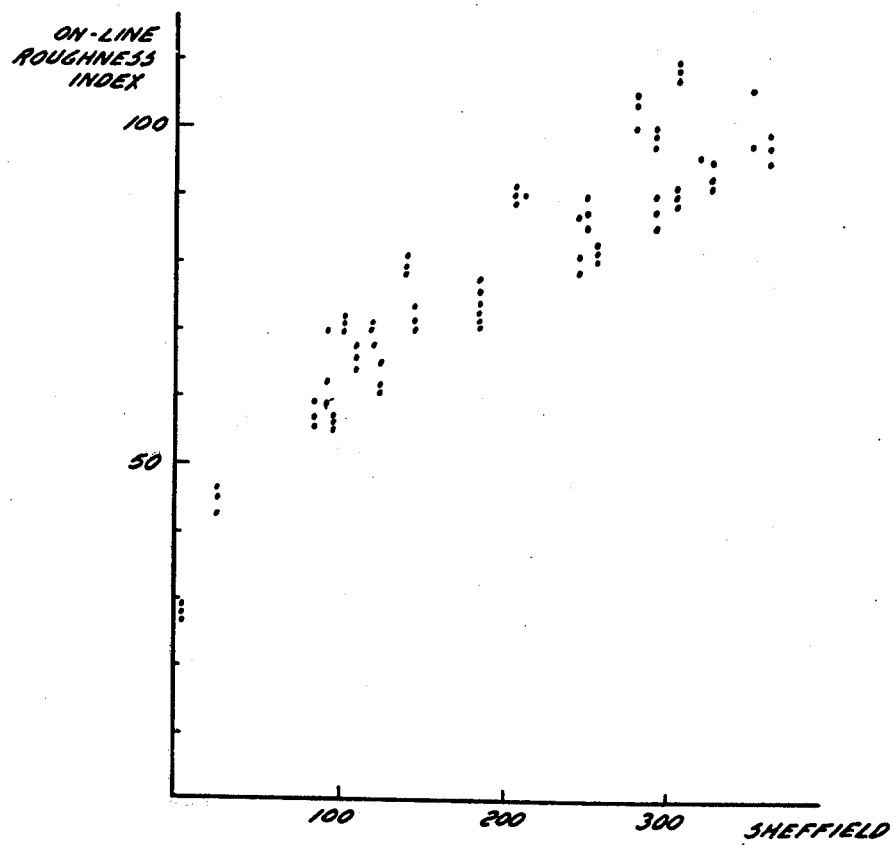
FIG. 5 is a diagram showing a comparison of the roughness measurement by the apparatus of the invention with a conventional Sheffield apparatus.

Referring more specifically to the drawings, in FIG. 1, 10 is a source of light emitting a substantially parallel beam 4 which illuminates obliquely the surface of a moving web or sheet of paper 2. By light, in the present context, is understood electro-magnetic radiation of any suitable frequency that can be conveniently used, thus the source may be one emitting light of a broad band of frequencies, or a selected narrow band, preferably in the visible or the near infra-red spectrum. The source of light may be a conventional incandescent source, such as a tungsten filament, or preferably a solid state light emitting source, such as a light emitting diode (LED), or a laser. The paper is kept in motion, e.g. by a winding roll (not shown). The direction of the beam may be the same as the movement of the paper, or at an angle to it. Optical collector 5 collects a beam of light scattered from the surface of the paper. The collector is generally set at a right angle to the surface and, as shown more particularly in FIG. 2, may consist of a lens or a series of lenses 12, which focus the scattered light collected from a small area of the surface and project a sharp image of said area at aperture 3, and through it onto detector 6. The light that strikes the detector at any particular instant thus corresponds to the quantity of light reflected from a very small area of the surface, such area being substantially determined by the size of aperture 13 and by the magnification effected by the lens system at aperture 13. The size of aperture 13 will be, for example, between 0.1mm and 5mm for a ×10 magnification, and may be greater or less depending on the degree of magnification.

The illumination of the surface is preferably at a relatively low angle to the surface so as to accentuate the contrast between the light and shadows cast by the "landscape" features on the surface, not unlike the illumination of a mountainous landscape before sunset or shortly after sunrise. Angles of inclination (the angle between the radiation axis of the source and the surface) within the range between 5° and 50° have been found suitable, but preferred use is made of angles between 15° and 30°.

The source 10 and collector 5, shown in FIG. 1, are rigidly set in a common support forming the head of the apparatus and adapted to be applied against the web, either in contact therewith or close enough thereto, so as to ensure that the distance from the source and the collector to the surface of the web is substantially constant. The head may be placed in a fixed position on the paper machine, or made to travel, e.g. across the machine, or may be portable and adapted to be applied, e.g. by hand, to a travelling web, or to a roll of paper or the like. An example of a support structure applied, e.g. by hand, against a travelling web is shown in FIG. 4. The structure consists essentially of solid frame 15 surrounding cavity 16 in which light source 10 and collector opening 20 are set at an appropriate angle to one another. Cavity 16 may be sealed with window 23, of suitable transparency for the light source used, to prevent dust, lint etc. from accumulating on the collector. In operation, the frame may be lightly pressed against the paper so that the paper is in contact with the frame (and the window, if present) all around the perimeter of cavity 16. This will ensure that the distance of the light source from the surface "viewed" by the collector opening from the surface, are all fixed. Aperture 13 is of a size to limit the "field of vision" to about the size of the smallest single significant topographic feature on the surface.

The light collected by the collector from each such small area of the surface is conveyed to detector 6 which converts it to an electrical signal, and the signal is amplified in amplifier 7. Detectors of the general type used in this invention are known and consist essentially of an electrical circuit containing a conductor element, the conductivity of which element varies in response to light. However, the demands placed on the performance of a detector suitable for use in the present invention are very exacting. It will be appreciated that the light reaching the detector at any one moment will be that reflected from a surface about 1/100 of a square millimeter in size; hence the detector must be sensitive to very small quantities of light. Furthermore, at a machine speed of about 2,000 ft. per minute, a surface feature about 1/10 millimeter in diameter (the size of the field of vision) enters and leaves the field of vision in about ten microseconds (0.00001 of a second), hence the need for a detector having a very fast response. Finally, the detector and the amplifier themselves are unavoidably a source of electrical "noise", consisting of random fluctuations not dissimilar to those generated by the scanning of the surface of the paper. The problem thus becomes one of analyzing the signal originating from the paper surface in the presence of noise generated within the detector or amplifier itself. The detector, including the amplifying system, must therefore be selected to limit this self-generated noise to a value not greater, say, than about 1/5 of the signal from the paper. Furthermore any detector will be more sensitive to some light wave lengths than to others, hence it is desirable to match the light source and the detector. A detector answering the requirements of extremely high sensitivity, fast response and low noise is, for example, the photo-detector manufactured by RCA and designated as C30816 in combination with amplifier OE19817 sold by Optical Electronics Corp. of Tuscon, Ariz., U.S.A. Such combination is appropriately matched with a light emitting diode, e.g. model SSL-35 manufactured by General Electric Company and also with any type of incandescent light. Other detectors, amplifiers and light sources can be readily selected by those skilled in the art.

Following the detector and amplifier the apparatus further comprises means to divide the issuing signal into its alternating component and direct component; these means are designated in FIG. 1, respectively as AC filter 8 and DC filter 9. The signal from the light detector, as will be easily understood from FIG. 3, consists of a fluctuating part (AC) generated by the reflection of light from the rapidly alternating topographic features of the surface and a steady part (DC) representing the average background reflection from the surface. Thus the roughness of the surface will be translated, for a given average illumination, into a greater or less fluctuation of the AC signal. In a general way an index of roughness will thus be derived by comparing the magnitudes of the AC and DC components of the issuing signal. Thus Index of Roughness = [AC Component (RMS)/DC Component] × $K$ where $K$ is a suitable coefficient to bring the measurements to a conveniently selected scale. The value of the AC or DC components should be determined over a reasonable length of the paper to provide statistically significant measurements. For example, the magnitude of the AC component may be evaluated as its root means square value with an integration time of about 30–100 msec for paper speed of about 2000 fpm. These values, of course, are by no means critical and may be altered according to the desired degree of statistical accuracy.

The DC component is extracted by means of DC filter 9, while the AC component is extracted by AC filter 8 and transformed into DC voltage, e.g. by RMS converter 14 or any other suitable converter. The readings corresponding to the original DC and AC voltages are then fed to a simple computing device 17 which calculates the Index, as above defined, and a reading of the index is shown in any suitable manner, e.g. on display screen 18.

Certain additional controls may have to be incorporated in the circuit. Thus, with certain types of detector systems, such as the one described herein, means have to be inserted for finding at frequent intervals the "zero" value of the DC voltage, i.e. the voltage generated in the absence of any light being collected or fed to the detector. Such voltage, of a value varying over time, may be generated in the circuit by causes not related to the optical phenomena, and if not separately detected, will simply add itself to the DC voltage due to the illumination, thus vitiating the measurement of the latter. Hence the Automatic zero set 19 which at regular intervals (e.g. every half-second) automatically determines the voltage in the DC circuit while the light source 10 is momentarily extinguished (see FIG. 3). A set of controls 21 activates and synchronizes the determination of "zero" value with the interruption of power supply to the light source 10, the necessary breaks of the AC circuit, and so on, substantially in a manner that will be known to a man skilled in the art. With certain other types of detector the Automatic zero set and the associated controls may not be necessary.

Additional filters (not shown) may be inserted in the AC circuit to eliminate, as far as possible, extraneous frequencies not due to the paper surface variations that it is desired to measure. Such extraneous frequencies will be generally lower than the ones generated by the surface features constituting roughness, if we regard 2 mm as the upper size limit of the surface features then, at paper speed of 2,000 feet per minute, the lowest frequency generated by the roughness of the paper will be of the order of 5KHz and any frequencies lower than these cannot be attributable to surface roughness and should therefore be eliminated. Filtering thus increases the accuracy of the instrument.

The following examples of measuring the surface roughness of various papers by means of an instrument of this invention are provided for the purpose of illustrating the invention, but should not be interpreted as limiting the same to the particular embodiments described.

EXAMPLE I

An instrument was constructed substantially in accordance with FIG. 1, using a tungsten light source of a narrow angle radiation pattern and a collector with an achromatic lens of 10× magnification, a numerical aperture 0.25 and a focal length 15mm. The collector aperture was 1 mm and the distance between the lens and the aperture was 12 cm. The light source was set in the frame so that a surface held in front of the lens was illuminated at an angle of 20°–25° with respect to that surface. The paper web to be tested was carried on a small roll, driven by an electric motor and located in front of the lens at a fixed distance (about 7mm), such that its image was sharply focussed at aperture 13. The paper was driven at various speeds simulating closely the movement of paper over a paper machine.

A series of tests was carried out with this instrument on a large number of machine direction strips cut out from a variety of fine paper samples. The measurements were performed at a paper speed of 2,600 fpm. The Roughness Index was calculated from the formula $$RI = [AC\ (RMS)/DC] \times 100$$

and the data for each sample were plotted against roughness values measured on the same sample by means of a conventional "static" Sheffield instrument. The correlation between "on-line" and Sheffield instruments is shown in FIG. 5.

Variations in the experiments were made, e.g. to test the effect of the colour of the paper, and to vary the speed of the paper between 1,000 fpm and 2,600 fpm, without noticeable effect on the results obtained.

EXAMPLE II

Figure 6B:
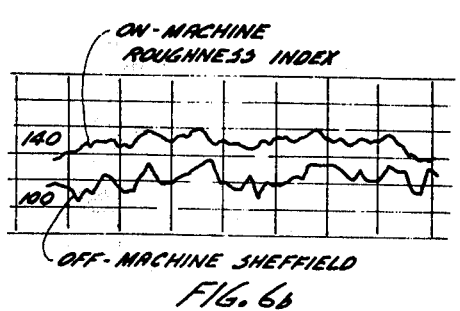
FIG. 6b shows a comparison of such an "on-line" profile with one made by means of a Sheffield.
Figure 6A:
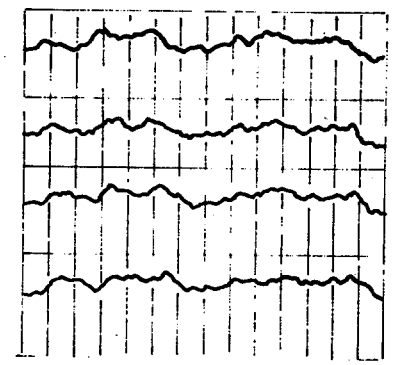
FIG. 6a shows typical roughness profiles taken on line by the apparatus of the invention on a paper machine.

A proto-type instrument for use in a mill was constructed substantially as in Example I, except that the light source was an infra-red light emitting diode of an output of 20 milliwatts and a narrow angle radiation (half of power output within cone of 20°). The illumination was set at 24° to the surface. The apparatus was installed on the 0 frame of a paper machine making tab card grade paper. The speed of the machine was about 1,000 fpm and the instrument was set to record cross-machine roughness profiles on line at 1 minute intervals. Fig. 6a illustrates typical successive profiles taken at random during the run. A comparison of such an on-line profile with a Sheffield profile of the same paper is shown in FIG. 6b. It is apparent from FIG. 6b that the correlation is very good except for the edges of the machines. It is believed that the difference is due to the Sheffield making no distinction between roughness and a waviness often encountered at the edges (so called grainy edges) whereas the instrument of this invention reacts to roughness only. control The invention, thus, provides a method and an instrument for the measuring of surface roughness on line, i.e. on a web moving with the high speeds which are now common in papermaking. By the method of the invention a roughness profile of a running web can be obtained in a matter of minutes or even seconds, instead of the laborious compiling of a multiplicity of static measurements by means of an air-leak instrument like the Sheffield on samples cut out from a roll of paper. A rapid and convenient method of measuring paper roughness on line will permit the paper-maker to improve contrl of roll build which often presents problems in mills. The method is particularly suitable for measuring the roughness of fine papers. When applying the method of the invention to papers other than fine paper, for example to newsprint, account should be taken of the possible existence on the surface of such other papers of other irregularities, e.g. of particles of lower brightness or reflectivity, which will be registered by the optical-electronic system of the instrument of the invention and in certain circumstances may distort the roughness measurements. However, even on such non-fine papers a useful comparison of surface roughness can be obtained by means of the apparatus and the method of this invention.

What we claim is:

1. An apparatus for the on-line measuring of the surface roughness of a moving web which comprises;
    illuminating means for projecting a beam of light obliquely onto the surface of said web;
    collector means disposed to collect scattered light reflected at a non-specular angle from a small area of said surface;
    a support structure adapted to be placed adjacent said surface, said illuminating means and said collector means being fixedly set in said support;

means providing relative movement between said web and said support thereby to collect reflected light from a multiplicity of small areas sequentially appearing in front of said collector means;

photoelectric means for converting the light collected from the said small areas into electrical signals;

and analyzer means for converting said electrical signals into an index of roughness, said analyzer means comprising means for dividing said electrical signals into a direct component and on alternating component and for computing the ratio of said alternating to said direct component, said ratio providing said index of roughness.

2. The apparatus of claim 1 further comprising means of displaying said index of roughness.

3. The apparatus of claim 1 wherein said illuminating means is set to project a beam of light an an angle to the surface between 5° and 50°.

4. The apparatus of claim 1 wherein said collector means is provided with an aperture limiting the light collected by said collector means to that reflected from an area of said surface having dimensions about 0.01–2 mm.

5. The apparatus of claim 1 wherein said photoelectric means comprises a detector responsive to light intensity variations up to a frequency of the order of 100,000 per second.

6. The apparatus of claim 1 further comprising means for finding the value of said direct component while said beam of light is extinguished thereby to set a "zero" value of said direct component.

7. A method of measuring the surface roughness of a moving web which comprises;
projecting a beam of light obliquely onto said surface;
collecting scattered light reflected at a non specular angle from a small area of said surface;
continuously moving said web thereby to collect scattered reflected light from a continuous sequence of small areas of said surface;
converting the collected light to electrical signals;
analyzing said electrical signals into a direct component and an alternating components;
computing the ratio of values of said direct and said alternating components said ratio providing an index of roughness.

8. The method of claim 7 wherein the angle of incidence is between 5° and 50°.

9. The method of claim 8 wherein the angle of incidence is between 15° and 30°.

10. The method of claim 7 wherein the light continuously collected is the one reflected from a continuous sequence of areas on the surface of the paper said areas having dimensions of the order of 0.01–2 mm.

11. The method of claim 7 wherein the magnitude of said alternating component is measured as the RMS of said alternating component.

12. The method of claim 7 wherein the index of roughness is calculated as the ratio of the magnitudes of said direct and said alternating components.

* * * * *